United States Patent [19]

Westphal

[11] 4,048,154
[45] Sept. 13, 1977

[54] MONOAZO DYESTUFFS DERIVED FROM P-SULFO-HALOPHENYL DIAZO MOIETY AND P-AMINO-O-ALKYL COUPLER MOIETY

[75] Inventor: Jochen Westphal, Duesseldorf, Germany

[73] Assignee: Bayer Aktiengesellschaft, Leverkusen, Germany

[21] Appl. No.: 524,989

[22] Filed: Nov. 18, 1974

[30] Foreign Application Priority Data

Nov. 20, 1973 Germany ............................. 2357934

[51] Int. Cl.² .................... C09B 29/08; D06P 1/06; D06P 3/06; D06P 3/16
[52] U.S. Cl. .................... 260/205; 260/206; 260/207; 260/207.1; 260/152; 260/156; 260/465 R; 260/508; 260/577
[58] Field of Search ............ 260/205, 206, 207, 207.1, 260/207.3, 207.5

[56] References Cited

U.S. PATENT DOCUMENTS

| | | | |
|---|---|---|---|
| 525,657 | 9/1894 | Julius | 260/205 |
| 1,003,293 | 10/1911 | Poliker | 260/205 |
| 1,590,728 | 6/1926 | Dorrer | 260/205 |
| 1,975,160 | 10/1934 | Jordan et al. | 260/205 X |
| 2,025,618 | 12/1935 | Senin | 8/5 |
| 2,126,477 | 8/1983 | Krzikalla et al. | 260/206 |
| 2,139,325 | 12/1938 | Biswell et al. | 260/205 |
| 2,576,037 | 11/1951 | Parker et al. | 260/205 |
| 2,782,186 | 2/1957 | Merian | 260/196 |
| 2,967,858 | 1/1961 | Merian et al. | 260/205 |
| 3,823,131 | 7/1974 | Stingl | 260/186 |

FOREIGN PATENT DOCUMENTS

| | | | |
|---|---|---|---|
| 445,827 | 2/1924 | Germany | 260/205 |
| 588,607 | 1/1932 | Germany | 260/205 |
| 696,313 | 8/1940 | Germany | 260/205 |
| 723,845 | 7/1942 | Germany | 260/205 |
| 16,537 of | 1913 | United Kingdom | 260/205 |
| 220,303 | 10/1925 | United Kingdom | 260/205 |

OTHER PUBLICATIONS

Colour Index, Third Edition, vol. 4, p. 4043, #'s 13010 and 13025 and p. 4047, #13150 (1971).

Primary Examiner—Floyd D. Higel
Attorney, Agent, or Firm—Plumley and Tyner

[57] ABSTRACT

Dyestuffs of the formula

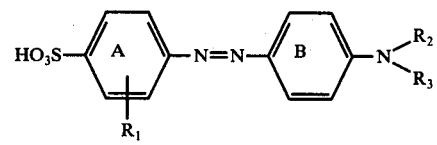

wherein $R_1$ represents a non-ionic substituent, $R_2$ and $R_3$ represent hydrogen, alkyl, acyl or aryl and wherein the two benzene rings A and B can in addition also be substituted by the non-ionic substituents as well as their preparation and their use for dyeing and printing fiber materials containing nitrogen, especially fiber materials consisting of polyamides, to give level orange to red dyeings with good dyestuff yields.

2 Claims, No Drawings

MONOAZO DYESTUFFS DERIVED FROM P-SULFO-HALOPHENYL DIAZO MOIETY AND P-AMINO-O-ALKYL COUPLER MOIETY

The invention relates to monoazo dyestuffs which in the form of the free acid correspond to the formula

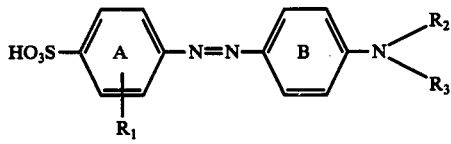

(I)

their preparation and their use for dyeing and printing fibre materials containing nitrogen, especially fibre materials consisting of polyamides.

In the formula I, $R_1$ represents halogen, nitrile, optionally substituted alkyl, aryl, aralkyl, alkoxy, aryloxy, aralkyloxy, alkylcarbonyl, arylcarbonyl, aralkylcarbonyl, hydroxyl, carboxyl, alkoxycarbonyl, aryloxycarbonyl, aralkyloxycarbonyl, aminocarbonyl which can be monosubstituted or disubstituted by alkyl, aryl or aralkyl at the nitrogen, alkylsulphonyl, arylsulphonyl, acylamino, aryloxysulphonyl or trifluoromethyl, and $R_2$ and $R_3$ independently of one another present hydrogen, alkyl, which is optionally substituted by nitrile, dialkylamino, halogen or alkoxy, acyl or an optionally substituted aryl radical, and $R_2$ and $R_3$ can also conjointly represent alkylene with 4 to 6 C atoms which can be interrupted by oxygen or NH.

The two benzene rings A and B of the formula I can in addition also be substituted further by the substituents mentioned under $R_1$.

The dyestuffs according to the invention always contain only one sulphonic acid group.

In the abovementioned meanings of substituents, halogen for example represents fluorine, chlorine and bromine; alkyl and alkoxy groups preferably have 1 to 6 C atoms and can be substituted further by, for example, halogen, nitrile, hydroxyl or $C_1$-$C_4$-alkoxy; aryl groups are, in particular, phenyl groups, which can optionally be substituted further by halogen, nitro, hydroxyl, nitrile, $C_1$-$C_4$-alkyl or $C_1$-$C_4$-alkoxy; aralkyl groups are, for example, phenyl-$C_1$-$C_4$-alkyl groups which can contain further substituents such as halogen, hydroxyl, nitrile, nitro, $C_1$-$C_4$-alkyl or $C_1$-$C_4$-alkoxy in the phenyl radicals; by acyl radicals there are preferably understood $C_1$-$C_4$-alkylcarbonyl and benzoyl radicals which can possess yet further substituents such as halogen, nitrile, hydroxyl, $C_1$-$C_4$-alkyl and $C_1$-$C_4$-alkoxy.

Preferred dyestuffs correspond to the formula

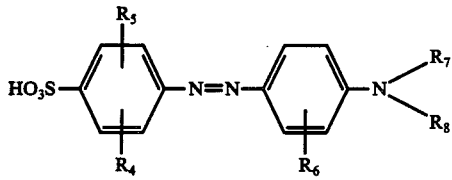

(II)

wherein $R_4$ denotes halogen, nitrile, $C_1$-$C_4$-alkyl, $C_1$-$C_4$-alkoxy, $C_1$-$C_4$-alkylsulphonyl, trifluoromethyl, phenoxy, $C_2$-$C_5$-alkoxycarbonyl or aminocarbonyl which can be monosubstituted or disubstituted by $C_1$-$C_4$-alkyl or phenyl at the nitrogen, $R_5$ denotes hydrogen or $R_4$, $R_6$ denotes hydrogen, $C_1$-$C_4$-alkyl, $C_1$-$C_4$-alkoxy, $C_2$-$C_5$-alkylcarbonylamino, benzoylamino or halogen and $R_7$ and $R_8$ independently of one another denote hydrogen or $C_1$-$C_6$-alkyl which is optionally substituted by nitrile or halogen, and $R_7$ and $R_8$ can also conjointly represent —$(CH_2)_5$—, —$(CH_2)_2$—O—$(CH_2)_2$— or —$(CH_2)_2$—NH—$(CH_2)_2$—.

Very particularly preferred dyestuffs are those of the formula

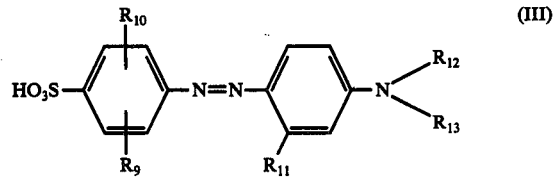

(III)

wherein $R_9$ ... halogen, such as chlorine and bromine, $R_{10}$ ... hydrogen, halogen such as chlorine and bromine, nitrile or trifluoromethyl, $R_{11}$ ... hydrogen or alkyl with 1 to 4 C atoms and $R_{12}$ and $R_{13}$ ... hydrogen or alkyl with 1 to 4 C atoms.

The dyestuffs of the formula I are prepared in the usual manner by diazotising amines of the formula

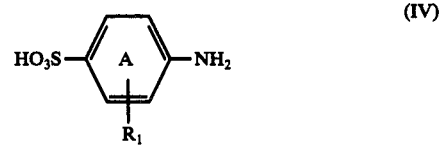

(IV)

wherein $R_1$ and A have the abovementioned meaning and coupling the product with anilines of the formula

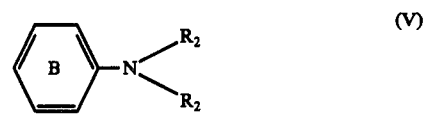

(V)

wherein $R_2$, $R_3$ and B have the abovementioned meaning.

Examples of suitable diazo components of the formula IV are 3-chloro-4-aminobenzenesulphonic acid, 2,5-dichloro-4-aminobenzenesulphonic acid, 2-methyl-4-amino-5-chlorobenzenesulphonic acid, 3-methyl-4-aminobenzenesulphonic acid, 3-bromo-4-aminobenzenesulphonic acid, 2-chloro-4-amino-5-methylcarbonylbenzenesulphonic acid, 2-chloro-4-amino-5-methoxycarbonylbenzenesulphonic acid, 3-methylcarbonyl-4-aminobenzenesulphonic acid, 3-methoxycarbonyl-4-aminobenzenesulphonic acid, 2-chloro-4-amino-5-dimethylaminocarbonylbenzenesulphonic acid, 2-chloro-4-amino-5-methoxybenzenesulphonic acid, 3-methoxy-4-aminobenzenesulphonic acid, 2-methyl-4-amino-5-methoxybenzenesulphonic acid, 3-ethoxy-4-aminobenzenesulphonic acid, 3-phenoxy-4-aminobenzenesulphonic acid, 2-chloro-4-amino-5-(4-chlorophenoxy)-benzenesulphonic acid, 2-chloro-4-amino-5-phenoxybenzenesulphonic acid, 2-methoxy-4-aminobenzenesulphonic acid, 2-methoxycarbonyl-4-aminobenzenesulphonic acid, 2-ethoxycarbonyl-4-aminobenzenesulphonic acid, 2-dimethylaminocarbonyl-4-aminobenzenesulphonic acid, 2-bromo-4-amino-5-methylbenzenesulphonic acid, 2-methoxy-4-amino-5-methylbenzenesulphonic acid, 2,3-dimethyl-4-aminobenzenesulphonic acid, 2,5-dimethyl-4-aminobenzenesulphonic acid, 2-chloro-3-methyl-4-aminobenzenesulphonic acid, 2,6-dichloro-3-phenoxy-4-aminobenzenesulphonic acid, 3-phenylsulphonyl-4-aminobenzenesulphonic acid, 2-ethylsulphonyl-4-amino-5-methoxybenzenesulphonic acid, 2-methoxy-4-amino-5-ethylsulphonylbenzenesulphonic acid, 2-methyl-4-amino-5-ethylsulphonylbenzenesulphonic acid, 2-chloro-4-amino-5-cyanobenzenesulphonic acid and 2-trifluoromethyl-4-amino-5-chlorobenzenesulphonic acid.

Examples of suitable coupling components of the formula V are aniline, N,N-dimethylaniline, N,N-diethylaniline, N,N-di-n-propylaniline, N,N-di-n-butylaniline, N-phenyl-N-methylaniline, N-methyl-N-β-cyanoethylaniline, N-ethyl-N-β-cyanoaniline, N-ethyl-N-β-dimethylaminoethylaniline, N,N-dimethyl-3-chloroaniline, N,N-3-trimethylaniline, N,N-diethyl-3-methylaniline, N-ethyl-N-β-dimethylaminoethyl, 3-methylaniline, N,N-2,5-tetramethylaniline, N,N-diethyl-3-methoxyaniline, N,N-diethyl-3-ethoxyaniline, N-phenylmorpholine, N-phenylaniline, N-phenyl-3-methylaniline, N,3-dimethyl-N-ethylaniline, N-β-cyanoethyl-3-methylaniline, N-n-butyl-N-β-cyanoethyl-3-methylaniline, 2-methoxy-5-methylaniline, 2,5-diethoxyaniline, 3-acetylaminoaniline, N-ethylaniline, N-n-butylaniline, N-(β-methoxyethyl)-aniline, N-(β-cyanoethyl)-aniline, N-(β-carbomethoxyethyl)-aniline, N-(β-chloroethyl)-aniline, N-(β-acetoxyethyl)-aniline, N,N-bis-(ω-cyanoethoxyethyl)-aniline, N-(methyl, ethyl or butyl)-N-β-cyanoethyl)-3-methylaniline, N,N-diethyl-3-trifluoromethylaniline, N-ethyl-N-(β-dimethylaminoethyl)-3-methylaniline, N,N-bis-(β-acetoxyethyl)-3-benzoylaminoaniline, N,N-diethyl-3-acetoxyacetylaminoaniline, N,N-diethyl-3-hydroxyacetylaminoaniline, N,N-diethyl-3-phenylsulphonylaminoaniline, 3-(N,N-diethylamino)-phenylurea, N,N-diethyl-3-methoxycarbonylaminoaniline and N,N-diethyl-3-dimethylaminosulphonylaminoaniline.

The dyestuffs of the formula I can be isolated, and passed on to their further use, in the form of the free acid or as alkali metal salts or ammonium salts. They can, however, also be obtained, and be employed for dyeing, as a stable concentrated solution. Suitable alkali metal salts are, for example, the lithium, sodium or potassium salts.

The dyestuffs according to the invention are suitable for dyeing and printing nitrogen-containing but fibre materials, for example wool and silk, but especially for dyeing polyamides. They give level orange to red dyeings of good yield. They are absorbed well on polyamide fibres even from a neutral to weakly acid dye bath. By polyamide fibres there are here especially understood fibres of synthetic polyamides such as ε-polycaprolactam or condensation products of adipic acid and hexamethylenediamine.

EXAMPLE 1

24.2 g (0.1 mol) of 4-amino-2,5-dichlorobenzenesulphonic acid are stirred with 0.2 of 2 N HCl, the mixture is cooled to 10° C by adding approx. 100 g of ice and diazotisation is carried out at this temperature over the course of approx. 20 minutes with a solution of 6.9 g (0.1 mol) of sodium nitrite in 25 ml of water. Stirring is allowed to continue for one hour at 10° C and thereafter the excess nitrite is destroyed by adding a little amidosulphonic acid solution.

16.3 g (0.1 mol) of N,N-diethyl-3-methylaniline are dissolved in 10 ml of concentrated hydrochloric acid and the mixture is cooled to approx. 10° C by adding ice. The solution of the diazotised amine is added to the above solution and the pH value is maintained at between 3.5 and 4.5 by adding saturated aqueous acetate solution. After completion of the coupling reaction, the pH value is adjusted to approx. 7 to 8 with concentrated sodium hydroxide solution and the dyestuff is filtered off and dried. In the acid form, it corresponds to the formula

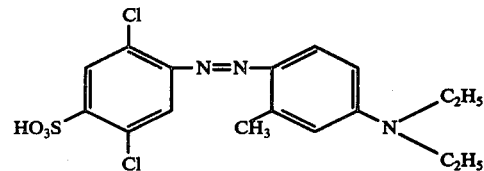

and is suitable for dyeing polyamide in red-orange colour shades.

If, in Example 1, the components are replaced by the compounds indicated in the table, further dyestuffs which dye polyamide in orange to red shades are obtained.

| Example | Diazo component | Coupling component |
|---|---|---|
| 2 | 4-amino-2,5-dichlorobenzenesulphonic acid | aniline |
| 3 | 4-amino-2,5-dichlorobenzenesulphonic acid | 3-methylaniline |
| 4 | 4-amino-2,5-dichlorobenzenesulphonic acid | 2-methoxy-5-methylaniline |
| 5 | 4-amino-2,5-dichlorobenzenesulphonic acid | 3-acetylaminoaniline |
| 6 | 4-amino-2,5-dichlorobenzenesulphonic acid | 2-methoxy-5-acetylaminoaniline |
| 7 | 4-amino-2,5-dichlorobenzenesulphonic acid | N-ethylaniline |
| 8 | 4-amino-2,5-dichlorobenzenesulphonic acid | N-(β-cyanoethyl)-aniline |
| 9 | 4-amino-2,5-dichlorobenzenesulphonic acid | N-(β-chloroethyl)-aniline |
| 10 | 4-amino-2,5-dichlorobenzenesulphonic acid | N, N-dimethylaniline |
| 11 | 4-amino-2,5-dichlorobenzenesulphonic acid | N,N-diethylaniline |
| 12 | 4-amino-2,5-dichlorobenzenesulphonic acid | N-(n-butyl)-N-(β-chloroethyl)-aniline |
| 13 | 4-amino-2,5-dichlorobenzenesulphonic acid | N-ethyl-N-(β-cyanoethyl)-aniline |
| 14 | 4-amino-2,5-dichlorobenzenesulphonic acid | N-butyl-N-(β-cyanoethyl)-aniline |
| 15 | 4-amino-2,5-dichlorobenzenesulphonic acid | N-ethyl-N-(β-methoxyethyl)-aniline |
| 16 | 4-amino-2,5-dichlorobenzenesulphonic acid | N,N-bis-(β-cyanoethyl)-aniline |
| 17 | 4-amino-2,5-dichlorobenzenesulphonic acid | N,N-bis-(β-cyanoethoxyethyl)-aniline |
| 18 | 4-amino-2,5-dichlorobenzenesulphonic acid | N-ethyl-3-methylaniline |
| 19 | 4-amino-2,5-dichlorobenzenesulphonic acid | N-(β-cyanoethyl)-3-methylaniline |
| 20 | 4-amino-2,5-dichlorobenzenesulphonic acid | N-butyl-3-methylaniline |
| 21 | 4-amino-2,5-dichlorobenzenesulphonic acid | N,N,3-trimethylaniline |
| 22 | 4-amino-2,5-dichlorobenzenesulphonic acid | N-ethyl-N-(β-dimethylaminoethyl)-aniline |

-continued

| Example | Diazo component | Coupling component |
|---|---|---|
| 23 | 4-amino-2,5-dichlorobenzenesulphonic acid | N-phenylmorpholine |
| 24 | 4-amino-2,5-dichlorobenzenesulphonic acid | N,N-diethyl-3-chloroaniline |
| 25 | 4-amino-2,5-dichlorobenzenesulphonic acid | N,N-dimethyl-3-methoxyaniline |
| 26 | 4-amino-2,5-dichlorobenzenesulphonic acid | N-($\beta$-cyanoethyl)-2-chloroaniline |
| 27 | 4-amino-2,5-dichlorobenzenesulphonic acid | N,N-diethyl-3-cyanoaniline |
| 28 | 4-amino-2,5-dichlorobenzenesulphonic acid | N,N-dimethyl-3-acetylaminoaniline |
| 29 | 4-amino-2,5-dichlorobenzenesulphonic acid | N,N-diethyl-2-methoxy-5-acetylaminoaniline |
| 30 | 4-amino-2,5-dichlorobenzenesulphonic acid | N-N-dimethyl-2-phenoxy-5-formylaminoaniline |
| 31 | 4-amino-2,5-dichlorobenzenesulphonic acid | N,N-diethyl-2,5-dimethoxyaniline |
| 32 | 4-amino-2,5-dichlorobenzenesulphonic acid | diphenylamine |
| 33 | 4-amino-2,5-dichlorobenzenesulphonic acid | N-methyldiphenylamine |
| 34 | 4-amino-2,5-dichlorobenzenesulphonic acid | 3-methyldiphenylamine |
| 35 | 4-amino-3-chloro-benzenesulphonic acid | N,N-diethyl-3-methylaniline |
| 36 | 4-amino-3-chloro-benzenesulphonic acid | N-ethyl-N-($\beta$-cyanoethyl)-aniline |
| 37 | 4-amino-3-chloro-benzenesulphonic acid | N-ethyl-3-methylaniline |
| 38 | 4-amino-3-chloro-benzenesulphonic acid | N-butyl-N-($\beta$-cyanoethyl)-3-methylaniline |
| 39 | 4-amino-3-chloro-benzenesulphonic acid | N,N-diethyl-3-acetylaminoaniline |
| 40 | 4-amino-3-chloro-benzenesulphonic acid | diphenylamine |
| 41 | 4-amino-3-chloro-benzenesulphonic acid | 3-acetylaminodiphenylamine |
| 42 | 3-bromo-4-aminobenzenesulphonic acid | N,N-diethylaniline |
| 43 | 3-bromo-4-aminobenzenesulphonic acid | N,N-bis-($\beta$-cyanoethyl)-aniline |
| 44 | 3-bromo-4-aminobenzenesulphonic acid | N-butyl-3-chloroaniline |
| 45 | 3-bromo-4-aminobenzenesulphonic acid | N-phenylmorpholine |
| 46 | 3-trifluoromethyl-4-aminobenzenesulphonic acid | aniline |
| 47 | 3-trifluoromethyl-4-aminobenzenesulphonic acid | N,N-diethyl-2-methylaniline |
| 48 | 3-trifluoromethyl-4-aminobenzenesulphonic acid | N-ethyl-N-($\beta$-chloroethyl)-3-methylaniline |
| 49 | 3-trifluoromethyl-4-aminobenzenesulphonic acid | N-phenylpiperidine |
| 50 | 3-trifluoromethyl-4-aminobenzenesulphonic acid | N,N-dimethyl-2,5-dimethoxyaniline |
| 51 | 2-methyl-5-chloro-4-aminobenzenesulphonic acid | N,N-diethyl-3-methylaniline |
| 52 | 2-methyl-5-chloro-4-aminobenzenesulphonic acid | N,N-bis-($\beta$-cyanoethyl)-3-acetylaminoaniline |
| 53 | 2-methyl-5-chloro-4-aminobenzenesulphonic acid | N-methyl-3-chloroaniline |
| 54 | 2-cyano-4-aminobenzenesulphonic acid | N,N-diethyl-3-methylaniline |
| 55 | 2-cyano-4-aminobenzenesulphonic acid | N-butylaniline |
| 56 | 2-cyano-4-aminobenzenesulphonic acid | N-dimethylaminoethyl-3-methylaniline |
| 57 | 2-cyano-4-aminobenzenesulphonic acid | N,N-dimethyl-3-phenoxyaniline |

DYEING EXAMPLE 0.1 g of the dyestuff from Example 1 is dissolved in 100 ml of hot water. 5 ml of 10% strength ammonium acetate solution are added to the above solution, and the whole is diluted with water to a volume of 500 ml.

10 g of polyamide fabric are introduced into this solution, the dye bath is brought to the boil over the course of 20 minutes, 4 ml of 10% strength acetic acid are added and the mixture is kept at the boil for one hour. The fabric is then rinsed and dried at 70° to 80° C.

A polyamide fabric dyed red-orange and having very good fastness to light and to washing is obtained.

Polyamide fabric can also be dyed analogously with the dyestuffs of Examples 2 to 57.

I claim:

1. Monoazo dyestuff which in the form of the free acid has the formula

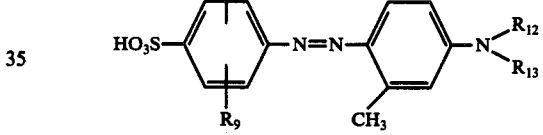

wherein
 $R_9$ is chlorine or bromine;
 $R_{10}$ is hydrogen, chlorine, bromine, cyano or trifluoromethyl; and
 $R_{12}$ and $R_{13}$ are hydrogen or $C_1$–$C_4$-alkyl.

2. Monoazo dyestuff of the formula

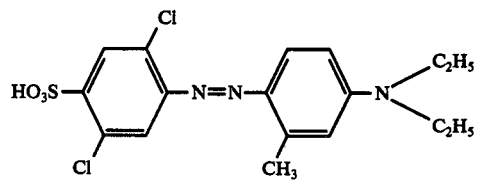

* * * * *